(12) United States Patent
Oohashi et al.

(10) Patent No.: US 6,172,434 B1
(45) Date of Patent: Jan. 9, 2001

(54) AUTOMOTIVE ALTERNATOR (75) Inventors: Atsushi Oohashi; Yoshihito Asao, both of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/479,906

(22) Filed: Jan. 10, 2000

(30) Foreign Application Priority Data

Jul. 16, 1999 (JP) .................................................... 11-203514

(51) Int. Cl.⁷ .............................. H02K 1/12; H02K 1/22; H02K 1/00
(52) U.S. Cl. ............................. 310/71; 310/263; 310/257; 310/194
(58) Field of Search ...................... 310/68 R, 51, 310/71, 91, 194, 208, 214, 257, 260, 263, 270

(56) References Cited

U.S. PATENT DOCUMENTS

| 4,114,056 | * | 9/1978 | Nimura | 310/42 |
| 4,565,936 | | 1/1986 | Ikegami et al. | 310/62 |

FOREIGN PATENT DOCUMENTS

| 0 015 167 A1 | 9/1980 | (EP) . | |
| 0 911944 A2 | 4/1999 | (EP) . | |
| 1576831 | 10/1980 | (GB) . | |
| 55-11717 | 2/1979 | (JP) . | |
| 60-99863 | 7/1985 | (JP) | H02K/9/06 |

* cited by examiner

Primary Examiner—Nestor Ramirez
Assistant Examiner—Guillermo Perez
(74) Attorney, Agent, or Firm—Sughrue, Mion, Zinn, Macpeak & Seas, PLLC (57) ABSTRACT

An automotive alternator in which a lead wire of a rotor coil extends along a wall formed in a root portion between claw-shaped magnetic poles so as to be substantially parallel to the axis of a shaft.

7 Claims, 10 Drawing Sheets

PRIOR ART

FIG. 9

PRIOR ART

PRIOR ART

FIG. 13

AUTOMOTIVE ALTERNATOR

BACKGROUND OF THE INVENTION

1. Field of the Invention

The present invention relates to an automotive alternator in which electric current is supplied to a rotor coil through lead wires from a slip ring assembly.

2. Description of the Related Art

Figure 8:
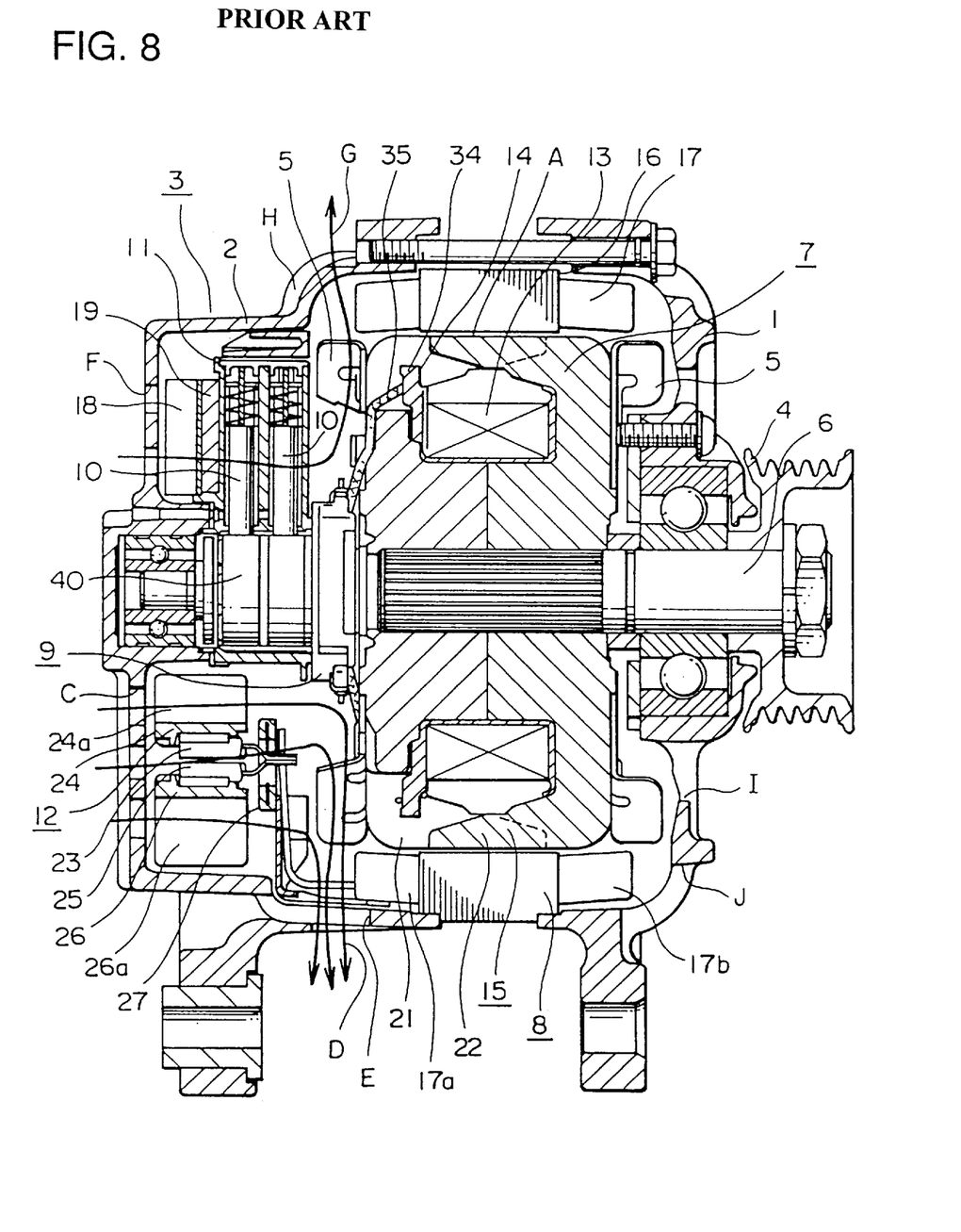
FIG. 8 is a cross section of a conventional automotive alternator.
Figure 9:
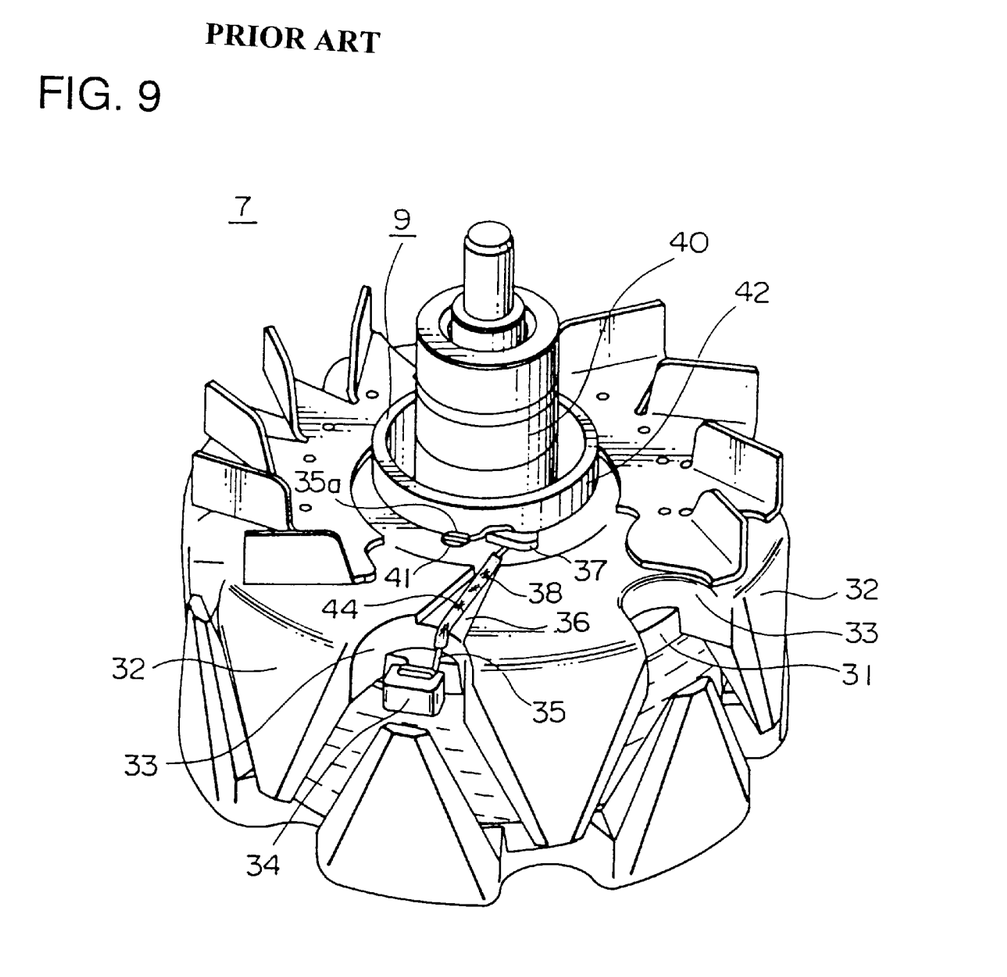
FIG. 9 is a perspective of the rotor in FIG. 8.
Figure 10:
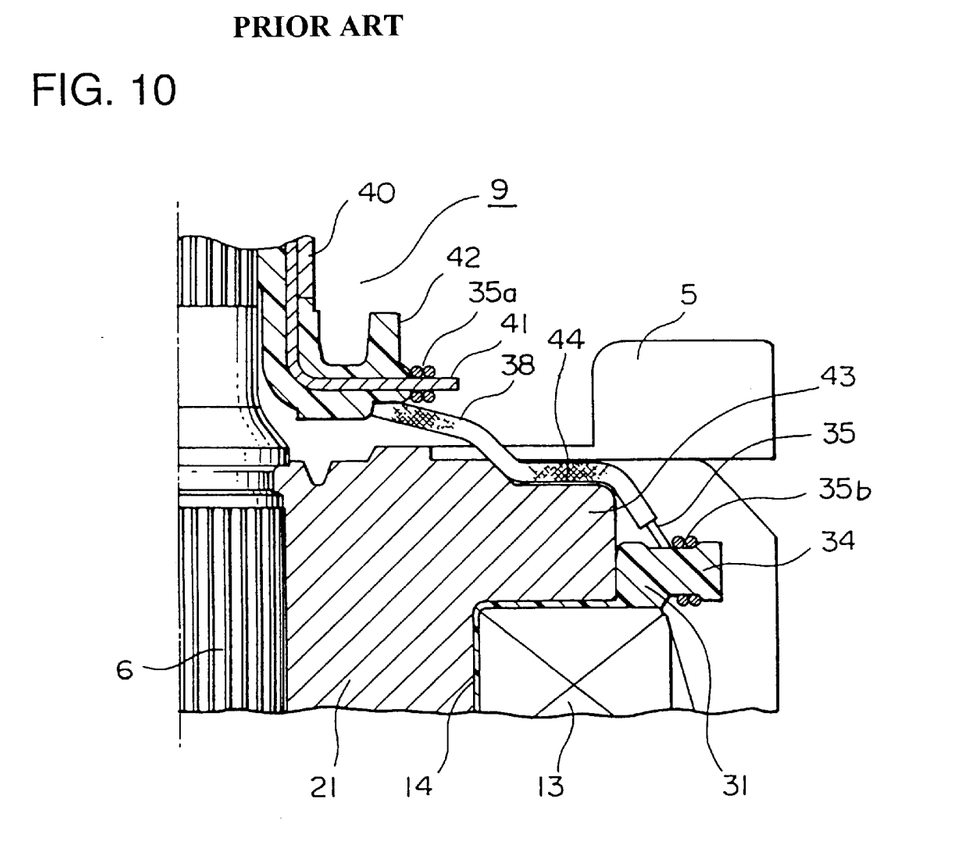
FIG. 10 is a partial cross section of the rotor in FIG. 8.
Figure 11:
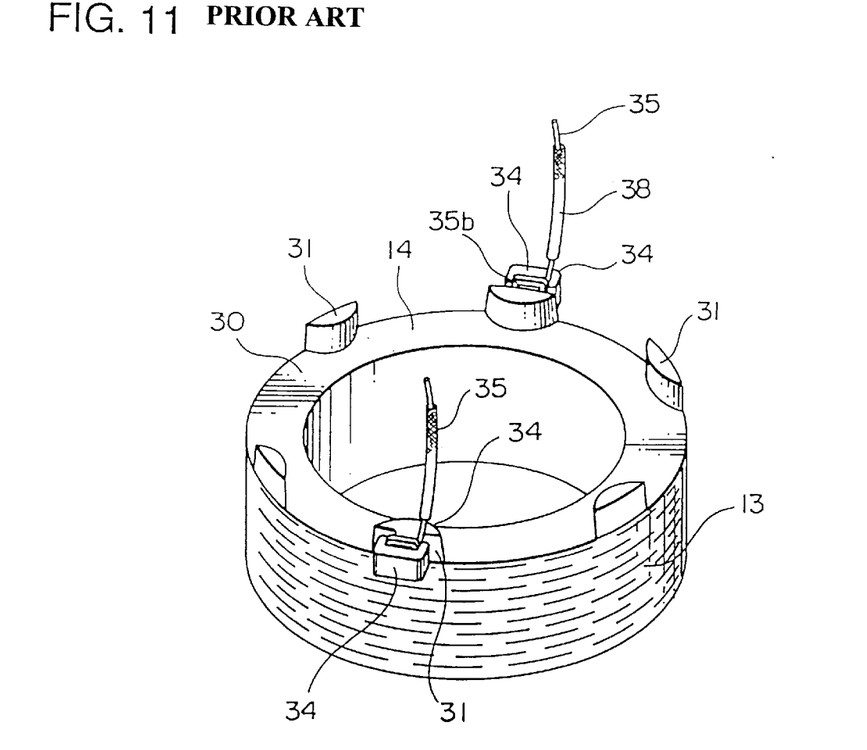
FIG. 11 is a perspective of the rotor coil in FIG. 10.
Figure 12:
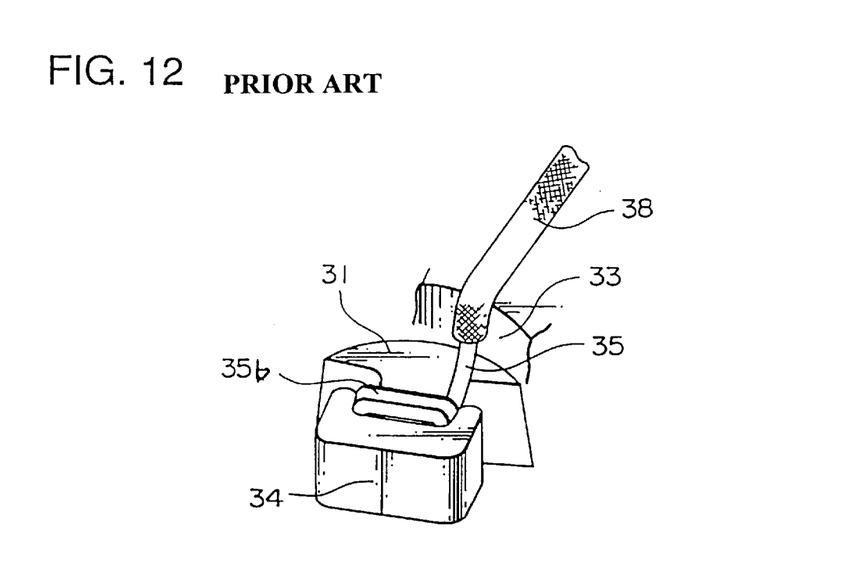
FIG. 12 is a partial perspective of FIG. 11.

FIG. 8 is a cross section of a conventional automotive alternator, FIG. 9 is a perspective of the rotor in FIG. 8 (part of a fan has been removed), and FIG. 10 is a partial cross section of FIG. 9.

This automotive alternator includes: a case 3 consisting of an aluminum front bracket 1 and an aluminum rear bracket 2; a shaft 6 disposed in the case 3 to one end of which a pulley 4 is secured; a Lundell-type rotor 7 secured to the shaft 6; fans 5 secured to both ends of the rotor 7; a stator 8 secured to the inner wall of the case 3; a slip ring assembly 9 secured to the shaft 6 for supplying electric current to the rotor 7; a pair of brushes 10; a brush holder 11 accommodating the brushes 10; a rectifier 12 in electrical contact with the stator 8 for converting alternating current generated in the stator 8 into direct current; a heat sink 18 fitted over the brush holder 11; and a regulator 19 fastened to the heat sink 18 with adhesive for adjusting the alternating current generated in the stator 8.

The rotor 7 includes: a rotor coil 13 composed of wire wound onto a bobbin 14 for generating magnetic flux by passing electric current therethrough; and a pole core 15 disposed so as to cover the rotor coil 13 in which magnetic poles are produced by the magnetic flux generated by the rotor coil 13. The pole core 15 includes a first pole core body 21 and a second pole core body 22, each composed of magnetic poles 32 which mutually intermesh, and is prepared by a casting method using mainly low-carbon steel.

The stator 8 includes: a stator core 16; and a stator coil 17 composed of wire wound into the stator core 16 in which an alternating current is generated by changes in the magnetic flux from the rotor coil 13 as the rotor 7 rotates.

The slip ring assembly 9 includes: slip rings 40 on which the tips of the brushes 10 slide; terminals 41 electrically connected to the slip rings 40; and a resin portion 42 into which the shaft 6 is pressed, the terminals 41 being embedded by insertion molding into the resin portion 42 except for a portion thereof.

The rectifier 12 includes: an arc-shaped positive-side heat sink 24 having a plurality of fins 24a on the reverse side thereof; a plurality of positive-side diodes 23 secured by soldering to a surface of the positive-side heat sink 24; an arc-shaped negative-side heat sink 26 having a plurality of fins 26a on the reverse side thereof; a plurality of negative-side diodes 25 secured by soldering to the negative-side heat sink 26; and a circuit board 27 for electrically connecting each of the diodes 23 and 25 to the stator coil 17, the rectifier 12 converting the three-phase alternating current generated by the stator 8 into direct current.

The positive-side heat sink 24 and the negative-side heat sink 26 are composed of aluminum which has high thermal conductivity, and the radially outer negative-side heat sink 26 is grounded by direct attachment to the case 3. The positive-side diodes 23 and negative-side diodes 25 are formed by molding resin so as to have an overall rectangular shape.

Arc-shaped stays 31 are disposed at even pitch around one of the flanges 30 of the bobbin 14 of the rotor 7. These stays 31 are engaged in root portions 33 cut into arc shapes between the claw-shaped magnetic poles 32 of the first pole core body 21 to prevent relative displacement between the rotor 7 and the pole core 15 in the circumferential direction. Winding portions 34 having an E-shaped cross section are integrally disposed on a pair of opposing stays 31. Base end portions 35b of lead wires 35 leading from the rotor coil 13 are doubly wound onto these winding portions 34. These lead wires 35 lie in grooves 36 extending from the root portions 33 to the slip ring assembly 9. The lead wires 35 are engaged by hooks 37 formed into the resin portion 42, and the tips 35a of the lead wires 35 are doubly wound onto the tips of the terminals 41. Middle portions of the lead wires 35 are covered by insulation tubing 38 fastened to the grooves 36 with adhesive 44. This insulation tubing 38 is provided to prevent the corners 43 of the root portions 33 from contacting the lead wires 35 and damaging the enamel coating of the lead wires 35 by abrasion.

In a vehicle alternator of the above construction, a current is supplied from a battery (not shown) through the brushes 10 and slip rings 40 to the rotor coil 13, whereby magnetic flux is generated, giving rise to a magnetic field, and at the same time the pulley 4 is driven by the engine and the rotor 7 is rotated by the shaft 6, so that a rotating magnetic field is imparted to the stator coil 17 and electromotive force is generated in the stator coil 17. This alternating electromotive force passes through the diodes 23 and 25 of the rectifier 12 and is converted into direct current, the magnitude thereof is adjusted by the regulator 19, and the battery is recharged.

Now, because the pulley ratio between the crank pulley (not shown) of the engine and the pulley 4 of the alternator is normally between 1:2.2 and 1:2.7, the rotor 7 of the automotive alternator is subjected to high operating speeds of 15,000 rpm or more and increases and decreases in rotational load due to sudden acceleration and deceleration of the engine, depending on the rotational frequency of the engine.

Figure 13:
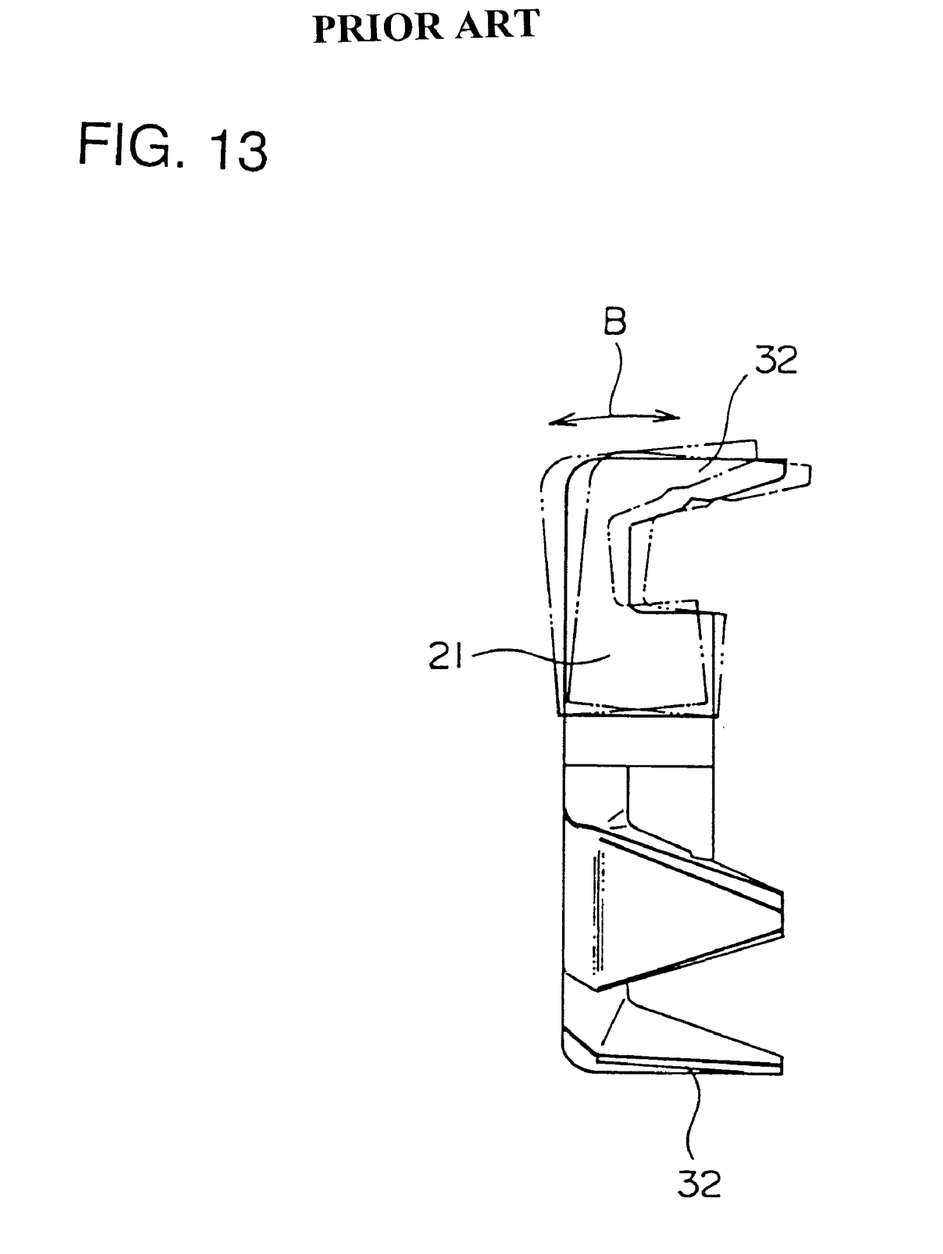
FIG. 13 is a side elevation of the first pole core body in FIG. 10.

Furthermore, during power generation at high speed, the first pole core body 21 and the second pole core body 22 vibrate greatly in the direction of arrow B in FIG. 13 due to magnetic attraction resulting from power generation arising in the gap A between the stator 8 and the rotor 7.

When the alternator is generating power, the rotor coil 13, the stator coil 17, the positive-side diodes 23, the negative-side diodes 25, and the regulator 19 constantly generate heat. For example, in an alternator with a rated output current in the 100 A class, the amount of heat generated is 60 W in the rotor coil 13, 500 W in the stator coil 16, a total of 120 W in the positive-side diodes 23 and the negative-side diodes 25, and 6 W in the regulator 19. The excessive generation of heat by these heat-generating bodies causes deterioration in the performance of the alternator and reduces the working life of the parts.

For that reason, the fans 5 are rotated together with the rotation of the rotor 7, external air is introduced into the case 3 through openings C in the case 3 by this rotation, and the external air flows as indicated by the arrows D in FIG. 8. Thus, after cooling the negative-side heat sink 26, the negative-side diodes 25, the positive-side heat sink 24, and the positive-side diodes 23, the external air is directed radially outwards by the fans 5, cools the end portions 17a of the stator coil 17 in the rear end, and is expelled to the outside through openings E.

External air is also introduced into the case 3 through openings F by the rotation of the fans 5, and the external air flows as indicated by the arrow G in FIG. 8. Thus, after cooling the power transistors of the regulator 18, the external air is directed radially outwards by the fans 5, cools the end portions 17a of the stator coil 17 in the rear end, and is expelled to the outside through openings H.

Similarly, external air introduced through openings I in the front bracket 1 is directed radially outwards by the fans 5, cooling the end portions 17b of the stator coil 17 in the front end. The external air is then expelled outside the case 3 through openings J.

During actual operation of a vehicle, because the ambient temperature within the engine room of the vehicle is a high 100° C., instantaneous temperatures can rise to approximately 200° C. in the rotor coil 13, the stator coil 17, and the diodes 23 and 25, and to approximately 150° C. in the heat sink 18 of the regulator 19. Thus, the slip ring assembly 9 and the lead wires 35 are exposed to temperatures of 150° C. or more due to the heat of air which has exchanged heat with the heat generating bodies such as the diodes 23 and 25, and due to radiant heat from the stator coil 16.

In the above automotive alternator, the rotor 7 is exposed to high-speed rotation, sudden acceleration and deceleration, high temperatures, and excessively large vibrations, subjecting the lead wires 35, which electrically connect the slip ring assembly 9 to the rotor coil 13, to centrifugal and vibrational forces.

In particular, because the winding portions 34, which are integrated with the stays 31, are disposed outside the outer circumferential surface of the rotor coil 13, one problem has been that the length of the lead wires 35 leading from the winding portions 34 to the slip ring assembly 9 is that much greater and the centrifugal force acting on the lead wires 35 is therefore greater due to the increase in the radial dimensions and weight of the lead wires 35, generating large stresses in the lead wires 35 and making the occurrence of breakages that much more frequent, thereby risking stoppage of the current supply required to generate the rotating magnetic field of the rotor 7 and consequently causing cessation of power generation.

Furthermore, because lead wires 35 rise up between the winding portion 34 and the corners 43 of the root portions 33, another problem has been that the lead wires 35 are susceptible to vibrations focused on the corners 43 and there has been a risk of breakages in the lead wires 35 at the corners 43, for example.

SUMMARY OF THE INVENTION

The present invention aims to solve the above problems and an object of the present invention is to provide an automotive alternator preventing breakages of the lead wires by reducing the centrifugal and vibrational forces the lead wires are subjected to.

To this end, according to the present invention, there is provided an automotive alternator comprising: a rotor coil for generating magnetic flux when a current flows therethrough being secured to a shaft and being composed of wire wound onto a bobbin; a pole core disposed so as to cover the rotor coil in which magnetic poles are formed by the magnetic flux in a plurality of claw-shaped magnetic poles; and a slip ring assembly secured to the shaft in close proximity to the pole core for supplying current to the rotor coil, a stay being formed on the bobbin for preventing relative displacement in the circumferential direction between the rotor coil and the pole core by engaging a root portion between the claw-shaped magnetic poles, and a lead wire leading from the rotor coil being electrically connected to the slip ring assembly, the lead wire extending along a wall formed in the root portion so as to be substantially parallel to the axis of said shaft.

DETAILED DESCRIPTION OF THE PREFERRED EMBODIMENTS

Embodiment 1

The preferred embodiments of the present invention will be explained below using the same numbering for parts the same as or corresponding to those in FIGS. 8 to 13.

Figure 1:
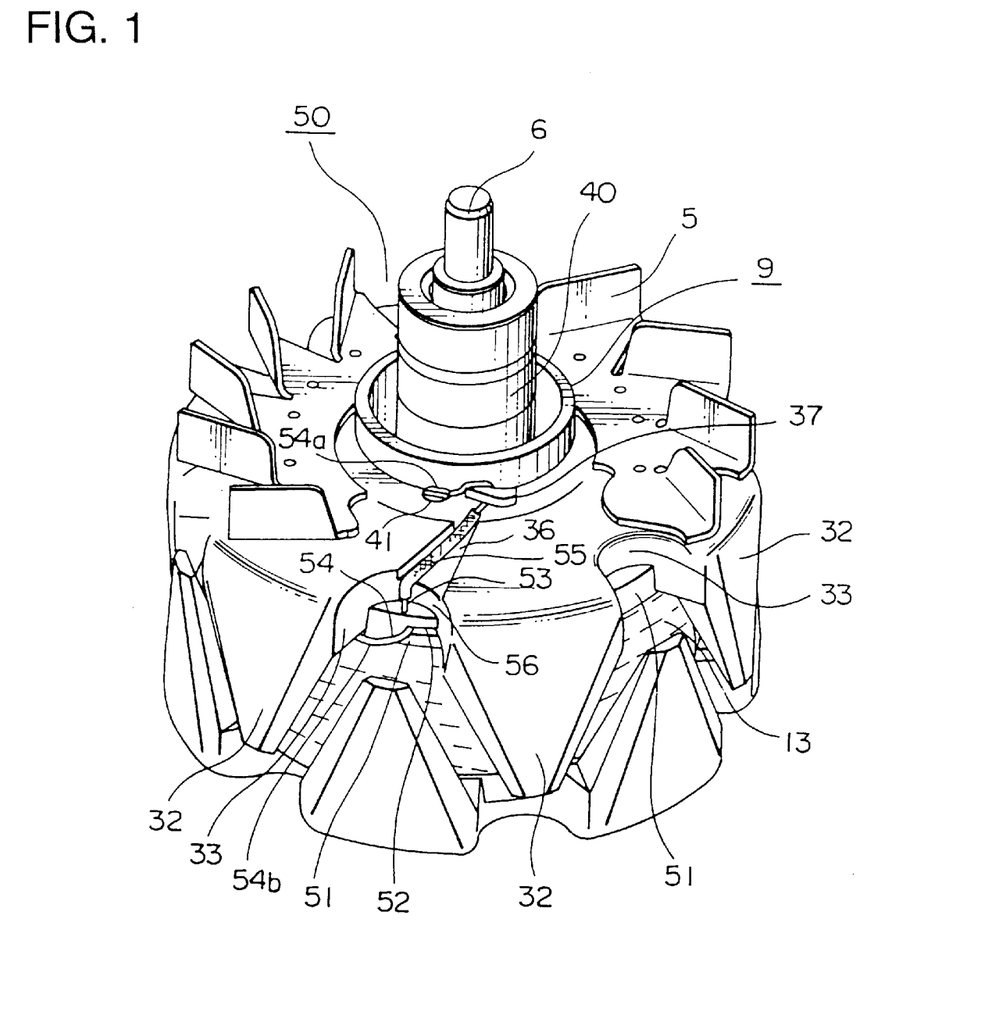
FIG. 1 is a perspective of a rotor for an automotive alternator according to Embodiment 1 of the present invention.
Figure 2:
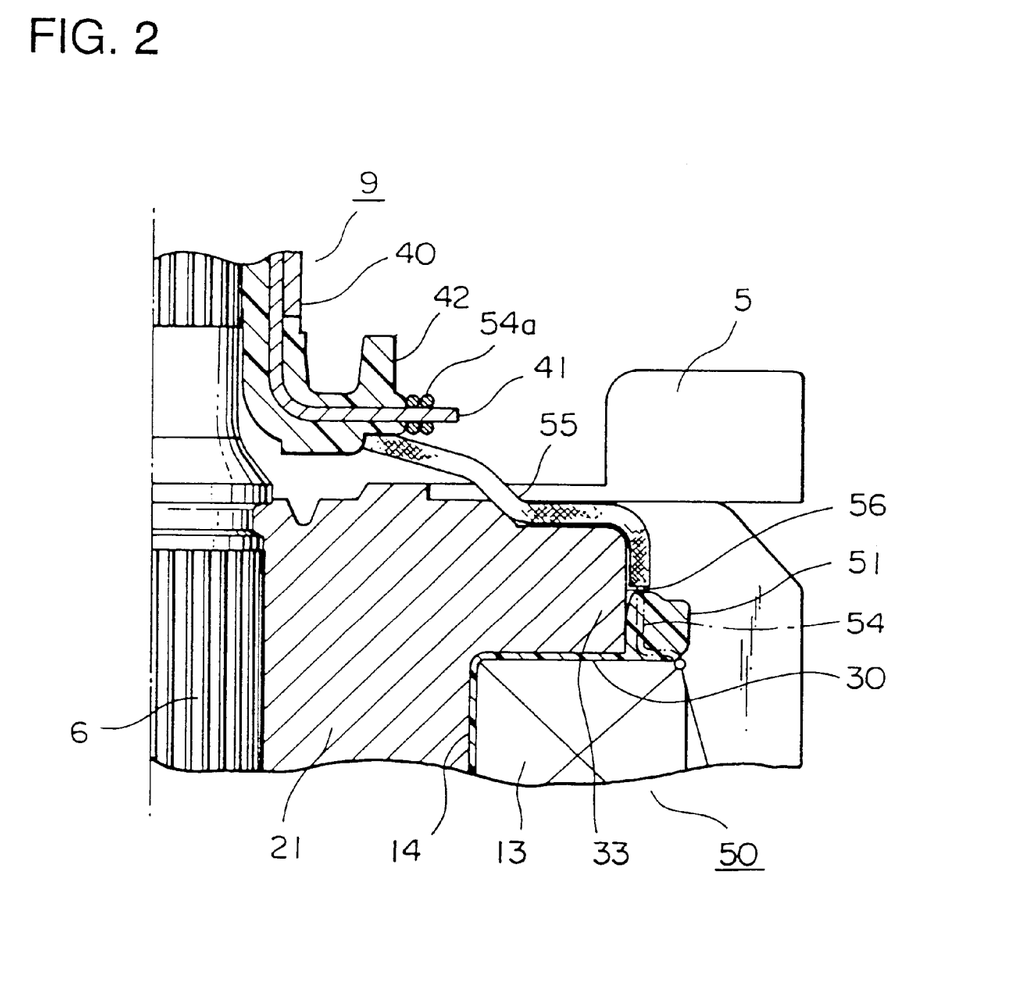
FIG. 2 is a partial cross section of the rotor in FIG. 1.

FIG. 1 is a perspective of a rotor for an automotive alternator according to Embodiment 1 of the present invention (part of a fan has been removed), and FIG. 2 is a partial cross section of the rotor in FIG. 1.

This automotive alternator includes: a case 3 consisting of an aluminum front bracket 1 and an aluminum rear bracket 2; a shaft 6 disposed in the case 3 to one end of which a pulley 4 is secured; a Lundell-type rotor 50 secured to the shaft 6; fans 5 secured to both ends of the rotor 50; a stator 8 secured to the inner wall of the case 3; a slip ring assembly 9 secured to the other end of the shaft 6 for supplying electric current to the rotor 50; a pair of brushes 10; a brush holder 11 accommodating the brushes 10; a rectifier 12 in electrical contact with the stator 8 for converting alternating current generated in the stator 8 into direct current; a heat sink 18 fitted over the brush holder 11; and a regulator 19 fastened to the heat sink 18 with adhesive for adjusting the alternating current generated in the stator 8.

The rotor 50 includes: a rotor coil 13 composed of wire wound onto a bobbin 14 for generating magnetic flux by passing electric current therethrough; and a pole core 15 disposed so as to cover the rotor coil 13 in which magnetic poles are produced by the magnetic flux generated by the rotor coil 13. The pole core 15 includes a first pole core body 21 and a second pole core body 22, each composed of magnetic poles 32 which mutually intermesh, and is prepared by a casting method using mainly low-carbon steel.

The stator 8 includes: a stator core 16; and a stator coil 17 composed of wire wound into the stator core 16 in which an alternating current is generated by changes in the magnetic flux from the rotor coil 13 as the rotor 50 rotates.

The slip ring assembly 9 includes: slip rings 40; terminals 41 electrically connected to the slip rings 40; and a resin portion 42 into which the shaft 6 is pressed, the terminals 41 being embedded by insertion molding into the resin portion 42 except for a portion thereof.

The rectifier 12 includes: an arc-shaped positive-side heat sink 24 having a plurality of fins 24a on the reverse side thereof; four positive-side diodes 23 secured by soldering to a surface of the positive-side heat sink 24; an arc-shaped negative-side heat sink 26 having a plurality of fins 26a on the reverse side thereof; a plurality of negative-side diodes 25 secured by soldering to the negative-side heat sink 26; and a circuit board 27 for electrically connecting each of the diodes 23 and 25 to the stator coil 17, the rectifier 12 converting the three-phase alternating current generated by the stator 8 into direct current.

Six arc-shaped stays 51 are disposed at even pitch around one of the flanges 30 of the bobbin 14 of the rotor 50. These stays 51 are engaged in root portions 33 cut into arc shapes between the claw-shaped magnetic poles 32 of the first pole core body 21 to prevent relative displacement between the rotor 50 and the pole core 15 in the circumferential direction. Of the six stays 51, two opposing stays 51 are each provided with a first engaging groove 52 and a second engaging groove 53 intersecting each other at right angles. Lead wires 54 leading from the rotor coil 13 are led through the first engaging groove 52 and into the second engaging groove 53. The lead wires 54 then extend along the groove portions 36 and after being engaged by hooks 37 and the tips 54a thereof are doubly wound onto the tips of the terminals 41. Middle portions of the lead wires 54 are covered by insulation tubing 55.

In an automotive alternator of the above construction, because the lead wires 54 are each placed in contact with and extend along walls 56 formed generally parallel to the axis of the shaft 6 in the root portions 33 of the first pole core body 21, the length of the lead wires 54 between the stays 51 and the hooks 37 is short and weight is reduced compared to a conventional alternator, enabling a reduction in the centrifugal force applied to the lead wires 35 and a reduction in the effects that vibrations in the first pole core body 21 have on the lead wires 54, thereby preventing breakages in the lead wires 54. Moreover, it is not absolutely necessary for the lead wires 54 to be in contact with the walls 56, and the lead wires 54 may be led towards the slip ring assembly 9 from a point inside the outer circumferential surface of the rotor coil 13.

When the present inventors conducted experiments using an automotive alternator of the above construction at an ambient temperature of 100° C. with the rotational frequency of the rotor 50 between 0 and 18,000 rpm in 30 second cycles, it was found that breakages in the lead wires 54 occurred after approximately 800 hours in the present embodiment compared to 150 hours in the conventional example, showing a significant improvement in tolerance to high speeds.

Embodiment 2

Figure 3:
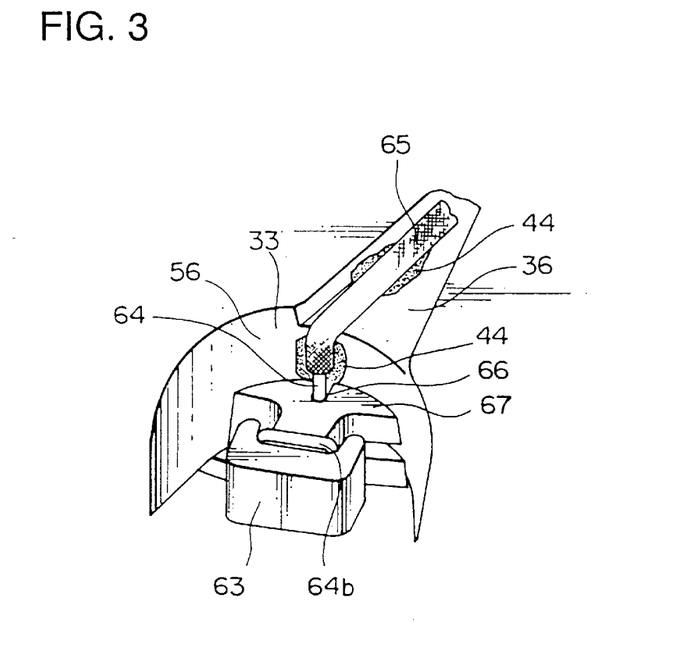
FIG. 3 is a partial perspective of a rotor for an automotive alternator according to Embodiment 2 of the present invention.
Figure 4:
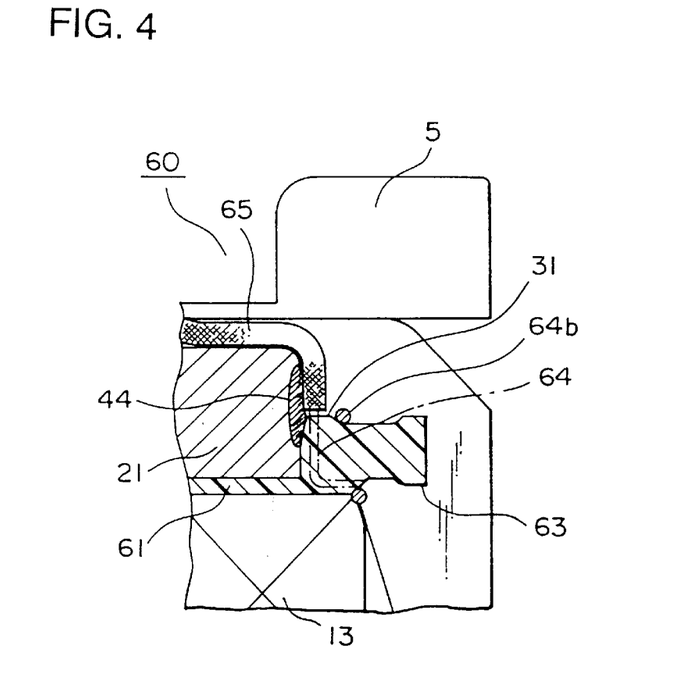
FIG. 4 is a partial cross section of FIG. 3.

FIG. 3 is a partial perspective of a rotor for an automotive alternator according to Embodiment 2 of the present invention, and FIG. 4 is a partial cross section of FIG. 3.

In this embodiment, winding portions 63 having an E-shaped cross section are integrally disposed on a pair of opposing stays 67 on a bobbin 61 of a rotor 60, and base end portions 64b of lead wires 64 leading from the rotor coil 13 are singly wound onto these winding portions 63. These lead wires 64 extend along walls 56 of the root portions 33 from engaging grooves 66 then extend along the groove portions 36. Insulation tubing 65 covering the lead wires 64 is fastened to the grooves 36 and the walls 56 with adhesive 44.

In this embodiment, because the base end portions 64b of the lead wires 64 are wound onto the winding portions 63, the base end portions 64b are engaged more reliably than the base end portions 54b of the lead wires 54 in Embodiment 1 which were engaged in engaging grooves 52 and 53, making it less likely that the lead wires 64 will be disengaged when the rotor 60 is being transported inside a factory, for example. Furthermore, compared to the conventional lead wires 35 which were wound onto the winding portions 34, the lead wires 64 are also engaged in engaging grooves 66, enabling the number of winds required to wind the lead wires 64 onto the winding portions 63 to be reduced (in the conventional example two turns were required; in this embodiment only one turn is required), in turn enabling the weight of the lead wires 64 to be reduced, thereby enabling the centrifugal force acting on the lead wires 64 to be reduced.

Furthermore, because the insulation tubing 65 covering the lead wires 64 is fastened to the grooves 36 and the walls 56 with adhesive 44, the lead wires move together with the first pole core body 21, reducing the vibrational frequency of the lead wires 64 themselves, and thereby improving tolerance of the lead wires 64 to vibration.

Embodiment 3

Figure 5:
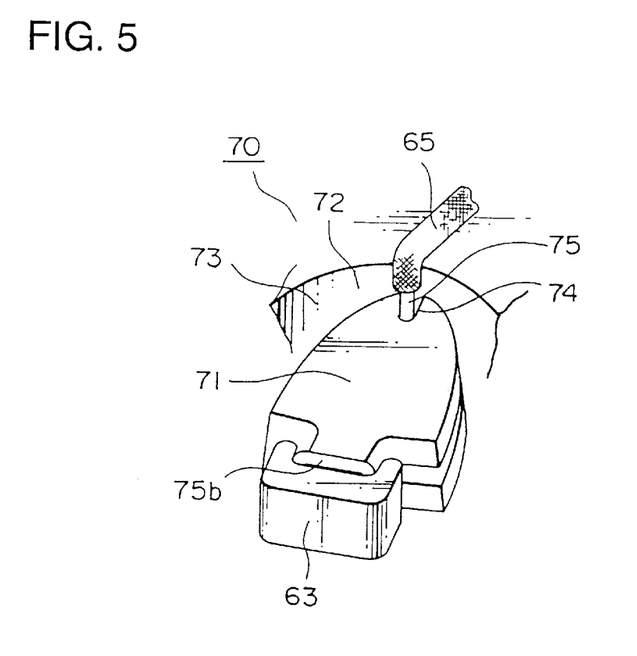
FIG. 5 is a partial perspective of a rotor for an automotive alternator according to Embodiment 3 of the present invention.

FIG. 5 is a partial perspective of a rotor for an automotive alternator according to Embodiment 3 of the present invention.

In the rotor 70 in this embodiment, winding portions 63 having an E-shaped cross section are integrally disposed on stays 71, and base end portions 75b of lead wires 75 of the rotor coil 13 are singly wound onto these winding portions 63. The stays 71 have a smaller radius of curvature at their tips than the stays 67 in Embodiment 2, their radial dimensions are greater, and the walls 73 of the root portions 72 of the first pole core body 21 are shaped to contact the stays 71.

In Embodiment 3, the tips of the stays 71 are formed in a general V shape, and engaging grooves 74 formed on the tips thereof are radially further inwards than in Embodiment 2, reducing the radial dimensions of the lead wires 75 proportionately, enabling the centrifugal force acting on the lead wires 75 to be reduced. Furthermore, because the contacting surface area between the walls 73 and the stays 71 is increased compared to Embodiment 2, relative displacement between the first pole core body 21 and the stays 71 is suppressed, reducing vibrations in the lead wires 75 themselves.

Embodiment 4

Figure 6:
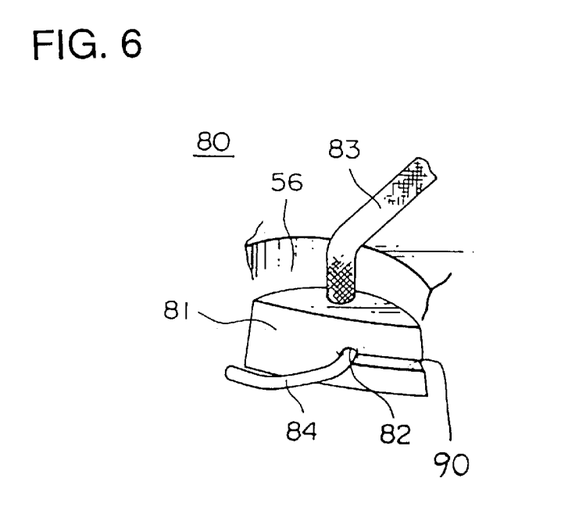
FIG. 6 is a partial perspective of a rotor for an automotive alternator according to Embodiment 4 of the present invention.
Figure 7:
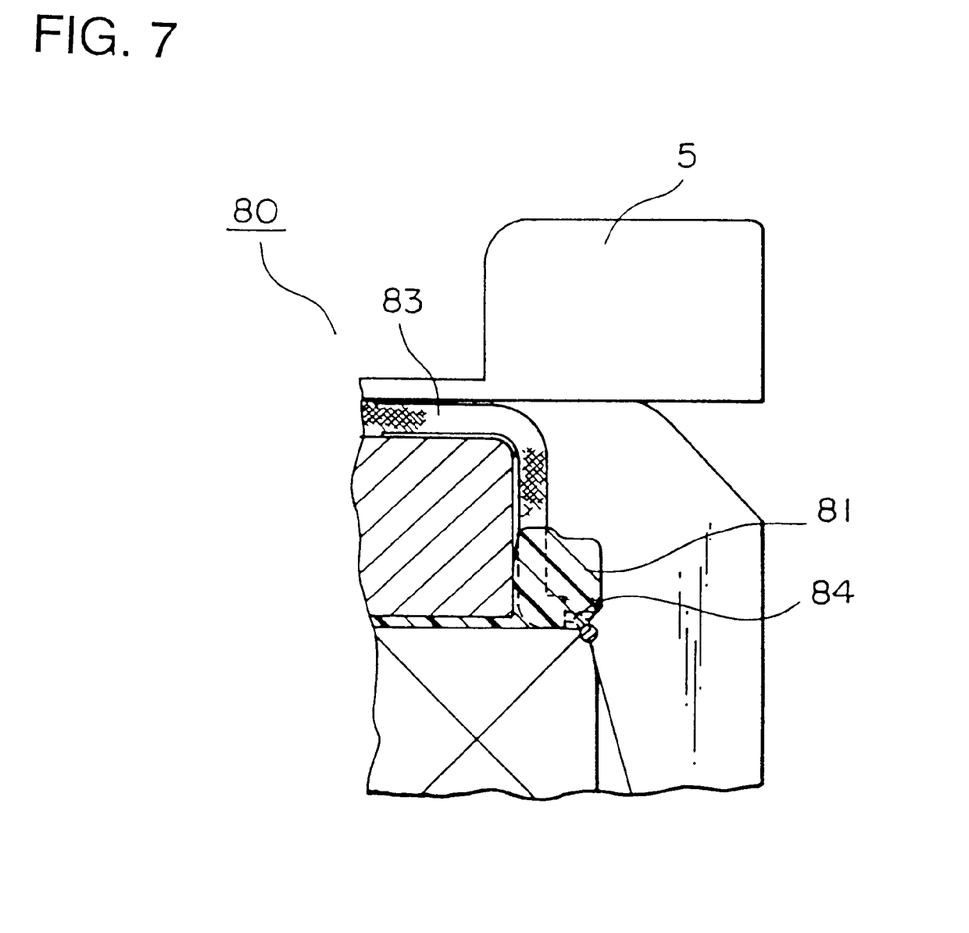
FIG. 7 is a partial cross section of FIG. 6.

FIG. 6 is a partial perspective of an automotive alternator according to Embodiment 4 of the present invention, and FIG. 7 is a partial cross section of FIG. 6.

In the rotor 80 in this embodiment, lead wires 84 inside engaging grooves 82 of stays 81 are covered by insulating tubing 83 except for a portion thereof.

In Embodiment 4, a large part of the load bearing on the lead wires 84 inside the engaging grooves 82 of the stays 81 is supported by the insulation tubing 83, reducing the occurrence of stress in the lead wires 84 and making it proportionately less likely that breakages will occur in the lead wires 84. Furthermore, because the width of entry portions 90 of the engaging grooves 82 is narrow, the lead wires 84 within the engaging grooves 82 are less likely to be displaced circumferentially, enabling the occurrence of breakages in the lead wires 84 to be reduced proportionately.

As explained above, an automotive alternator according to one aspect of the present invention comprises the lead wire extending along a wall formed in the root portion so as to be substantially parallel to the axis of the shaft. Therefore, because the radial dimensions of the lead wires connecting the slip ring assembly to the rotor coil are shorter and their weight is reduced compared to conventional alternators, enabling the centrifugal force applied to the lead wires to be reduced proportionately and suppressing vibrations in the lead wires themselves, breakages in the lead wires can be reduced.

According to one form of the automotive alternator, an engaging groove in which a base end portion of the lead wire is engaged may be formed in the stay. Therefore, the lead wires can be engaged in the stays without having to provide new members for engaging the lead wires.

According to another form of the automotive alternator, a winding portion onto which a base end portion of the lead wire is wound may be disposed on the stay. Therefore, the base end portions of the lead wires are reliably engaged by being wound onto the winding portions, preventing disengagement of the lead wires when the rotor is being transported inside a factory, for example.

According to still another form of the automotive alternator, the engaging groove of the stay may be formed such that the lead wire is led towards the slip ring assembly from further inwards than the outer circumferential surface of the rotor coil. Therefore, the radial dimensions and weight of the lead wires is proportionately smaller, enabling centrifugal force acting on the lead wires to be reduced, thereby enabling breakages in the lead wires to be more reliably prevented.

According to one form of the automotive alternator, the lead wire may be placed in contact with the wall of the root portion. Therefore, displacement of the lead wires is suppressed, enabling breakages in the lead wires to be more reliably prevented.

According to another form of the automotive alternator, the lead wire between the stay and the slip ring assembly may be covered with insulation tubing. Therefore, much of the load bearing on the lead wires is supported by the insulation tubing, reducing the occurrence of stress in the lead wires, thereby enabling breakages in the lead wires to be more reliably prevented.

According to still another form of the automotive alternator, the lead wire inside the engaging groove may be covered with insulation tubing. Therefore, a large portion of the load bearing on the lead wires inside the engaging grooves is supported by the insulation tubing, reducing the occurrence of stress in the lead wires, thereby enabling breakages in the lead wires inside the engaging grooves to be more reliably prevented.

According to one form of the automotive alternator, the pole core and the insulation tubing may be fastened to each other with adhesive. Therefore, the lead wires are displaced together with the pole cores, eliminating vibrations in the lead wires themselves, thereby preventing breakages due to vibrations in the lead wires themselves.

What is claimed is:

1. An automotive alternator comprising:
    a rotor coil for generating magnetic flux when a current flows therethrough being secured to a shaft and being composed of wire wound onto a bobbin;
    a pole core disposed so as to cover said rotor coil in which magnetic poles are formed by said magnetic flux in a plurality of claw-shaped magnetic poles;
    and a slip ring assembly secured to said shaft in close proximity to said pole core for supplying current to said rotor coil,
    a stay being formed on said bobbin for preventing relative displacement in the circumferential direction between said rotor coil and said pole core by engaging a root portion between said claw-shaped magnetic poles, and
    a lead wire leading from said rotor coil being electrically connected to said slip ring assembly,
    said lead wire extending along a wall formed in said root portion so as to be substantially parallel to the axis of said shaft;
    wherein an engaging groove in which a base end portion of said lead wire is engaged is formed in said stay.

2. The automotive alternator according to claim 1 wherein a winding portion onto which a base end portion of said lead wire is wound is disposed on said stay.

3. The automotive alternator according to claim 1 wherein said engaging groove of said stay is formed such that said lead wire is led towards said slip ring assembly from further inwards than the outer circumferential surface of said rotor coil.

4. The automotive alternator according to claim 1 wherein said lead wire is placed in contact with said wall of said root portion.

5. The automotive alternator according to claim 1 wherein said lead wire between said stay and said slip ring assembly is covered with insulation tubing.

6. The automotive alternator according to claim 5 wherein said pole core and said insulation tubing are fastened to each other with adhesive.

7. The automotive alternator according to claim 1 wherein said lead wire inside said engaging groove is covered with insulation tubing.

* * * * *